United States Patent [19]
Andrews et al.

[11] Patent Number: 5,697,264
[45] Date of Patent: Dec. 16, 1997

[54] POWER INPUT UNIT OF AN AXLE DRIVING SYSTEM

[75] Inventors: Keith J. Andrews, Morristown, Tenn.; Toshiyuki Hasegawa, Amagasaki, Japan

[73] Assignee: Kanzaki Kokyukoki Mfg. Co., Ltd., Japan

[21] Appl. No.: 550,472

[22] Filed: Oct. 30, 1995

[51] Int. Cl.[6] .................................................. F16H 37/06
[52] U.S. Cl. .................................. 74/665 GB; 74/730.1; 180/53.1
[58] Field of Search .................... 74/606 R, 665 GB, 74/730.1; 180/53.1

[56] References Cited

U.S. PATENT DOCUMENTS

| | | |
|---|---|---|
| 3,528,311 | 9/1970 | Fieber . |
| 3,907,058 | 9/1975 | Gunderson . |
| 4,373,597 | 2/1983 | Itatani et al. ............... 74/730.1 X |
| 4,513,834 | 4/1985 | Hayashi et al. . |
| 4,756,208 | 7/1988 | Hayashi et al. . |
| 4,914,907 | 4/1990 | Okada . |
| 5,078,659 | 1/1992 | von Kaler et al. . |
| 5,090,949 | 2/1992 | Thoma et al. . |
| 5,142,940 | 9/1992 | Hasegawa ................... 74/730.1 X |
| 5,211,077 | 5/1993 | Louis et al. ................. 74/730.1 X |
| 5,317,936 | 6/1994 | Shiba et al. ................... 74/606 R |
| 5,367,877 | 11/1994 | Irikura . |
| 5,392,670 | 2/1995 | Hauser ....................... 74/606 R |
| 5,473,964 | 12/1995 | Okada et al. ................ 180/53.1 X |
| 5,513,717 | 5/1996 | Louis et al. ................ 74/606 R X |
| 5,515,677 | 5/1996 | Irikura ...................... 180/53.1 X |
| 5,542,307 | 8/1996 | Hasegawa et al. ........... 74/730.1 X |
| 5,544,547 | 8/1996 | Ishimaru ................... 74/730.1 |

FOREIGN PATENT DOCUMENTS 63-110028   5/1988   Japan .

*Primary Examiner*—Rodney H. Bonck
*Assistant Examiner*—Peter T. Kwon
*Attorney, Agent, or Firm*—Sterne, Kessler, Goldstein & Fox P.L.L.C.

[57] ABSTRACT

The invention includes a working vehicle having a prime mover for horizontally outputting power to an axle driving system housing a transmission and a vertically projecting speed change input shaft. A gear box is detachably disposed at an upper portion of a housing of the axle driving system for transmitting power from the engine into the axle driving system. The gear box has an input shaft horizontally projecting therefrom and bevel gears such that the power transmitted horizontally from the engine changes direction in the gear box so that the power can be transmitted to the vertically disposed speed change input shaft of the transmission, which, in turn, drive the axles of the vehicle.

13 Claims, 11 Drawing Sheets

RELATED ART

POWER INPUT UNIT OF AN AXLE DRIVING SYSTEM

BACKGROUND OF THE INVENTION

1. Field of the Invention

The present invention relates to the transmission of power from a prime mover, such as an engine, to an axle driving system for a working vehicle. More particularly, the invention relates to a power unit provided at an upper portion of a housing of the axle driving system for transmitting power outputted from a power mover into the axle driving system.

2. Related Art

A mower tractor, as shown in FIG. 11, has a relatively small horsepower engine E, which has a crank shaft 100 that is vertically disposed. Output pulleys 101 and 102 are fixed onto crank shaft 100. A mower K is driven by output pulley 102 through a belt 103. Output pulley 101 transmits power therefrom to an input pulley 105 of an axle driving system T through a belt 104. Input pulley 105 is fixed onto an input shaft 106 that vertically projects from an upper surface of a housing of axle driving system T. Power transmitted from engine E to axle driving system T is speed-changed by a transmission in the axle driving system housing and transmitted to axles 17 so as to drive rear wheels 2. A cooling fan 13 is provided on input shaft 106. The driving wheels 1 and 2 are supported on body frame 3. A similar type of set-up is disclosed in U.S. Pat. Nos. 4,914,907; 4,756,208; 5,078,659 and 5,090,949.

As seen from above, a relatively small horsepower engine having a vertically oriented crank shaft drives an axle driving apparatus having a vertical input shaft by way of a pulley or a belt. However, when a larger working machine (such as a larger mower) is used on a vehicle, a larger horsepower engine is needed. With the larger horsepower engine, the crank shaft of the engine is horizontally disposed. Specifically, the output shaft of engine E projects horizontally. To improve the power transmission efficiency, a transmission shaft or a universal joint is used rather than a belt to drivingly connect the crank shaft with the input shaft of the axle driving apparatus.

However, a vertically disposed input shaft cannot transmit power from the horizontal output shaft of the engine through the transmission shaft into the vertical input shaft of the axle driving system without the use of a conventional gear box. A conventional gear box houses bevel gears to perpendicularly change the transmitting direction from a horizontal direction to a vertical direction. Specifically, the gear box uses pairs of bevel gears and shafts disposed at right angles to each other, so that the overall size of the axle driving system is vertically larger. As a result, the vehicle needs a large space to accommodate the axle driving system. Therefore, what is needed is a single unit that can be used to transmit power easily from an engine of the type having a horizontal output shaft to an axle driving system having a vertical input shaft.

In addition, the axle driving systems discussed above cannot take-out power directly. For example, as disclosed in U.S. Pat. No. 5,367,877, an input shaft for an axle driving system extends downwardly so as to extend through and enter into a gear box at a lower surface of the housing of the axle driving system. A power take-off shaft projects from the gear box to take power out to the axle driving system through transmission gears in the gear box. With this type of power take out, numerous gears are required which is very expensive. Hence, a power take-off shaft of simple construction is needed.

U.S. Pat. Nos. 3,528,311; 3,907,058 and 4,513,834 are further examples of working vehicles utilizing an engine having a horizontally projecting output shaft. In these patents, power is transmitted from the output shaft to an input shaft which horizontally projects from a housing of an axle driving system to drive the axles.

The axle driving systems that house such transmissions have a complex construction and require a larger housing. These types of axle driving systems, which are similar to that shown in FIG. 10, are manufactured differently than a compact axle driving system having a horizontal joint between housing sections. Therefore, when using a conventional manner to change power direction between an engine and an axle driving apparatus, is necessary to use an entirely different type of axle driving system, having different processing and assembly steps, which is expensive.

Hence, the present invention mounts a simple gear box on the housing of a conventional compact axle driving system so that the axle driving system of the present invention can be manufactured in a conventional production line.

SUMMARY OF THE INVENTION

An object of the invention is to enable a prime mover that outputs power substantially horizontally to be used to drive an axle driving system having a vertically disposed speed change input shaft and a transmission housed in a housing of the axle driving system. To accomplish this, a gear box is detachably fixed on an upper portion of the housing where an upper end of the speed change input shaft of the transmission is positioned. An input shaft is mounted substantially horizontally in the gear box and a bevel gear is provided on the input shaft in the gear box so as to engage with a bevel gear provided on the speed change input shaft. Thus, power from the engine can be transmitted into the input shaft through a transmission shaft and a universal joint. In the gear box, the horizontal power transmitting direction is changed to transmit the power to the vertically disposed speed change input shaft. As a result, the transmission in the axle driving system housing changes the speed for driving the axles as desired.

A speed change output shaft is drivingly connected with the speed change input shaft. The speed change output shaft and the speed change input shaft are positioned such that an axis of rotation of the speed change output shaft intersects an axis of rotation of the speed change input shaft.

Also, a cooling fan may he fixed on the input shaft to cool the housing of the axle driving system. A rear end of the input shaft also may project rearwardly from the gear box to be used as a power take-off shaft for driving an external working machine or a hydraulic actuator. Also, a vertical shaft may be supported on the upper surface of the gear box. Specifically, a bevel gear is fixed on the vertical shaft in the gear box so as to engage with a bevel gear provided on the input shaft and thereby drive the vertical shaft. A cooling fan may be fixed to the vertical shaft instead of on the input shaft so that the housing may be cooled. Also, this vertical shalt may serve as a driving shaft for inspecting or adjusting the operation of the axle driving system before shipment, so that the same type of system used to inspect or adjust an axle driving system without a gear box can be used to inspect or adjust the axle driving system of the present invention.

In another embodiment of the invention, a bevel gear box may mounted on an input shaft of a vertical crank shaft type engine so that the speed change input shaft, corresponding to the horizontal input shaft, can transmit power to the axle driving system having a vertical speed change input shaft.

These and other objects of the invention will become more apparent in the detailed description and examples which follow.

BRIEF DESCRIPTION OF THE FIGURES

Referring now to the drawings, which form a part of this original disclosure.

DETAILED DESCRIPTION OF PREFERRED EMBODIMENTS

Figure 1:
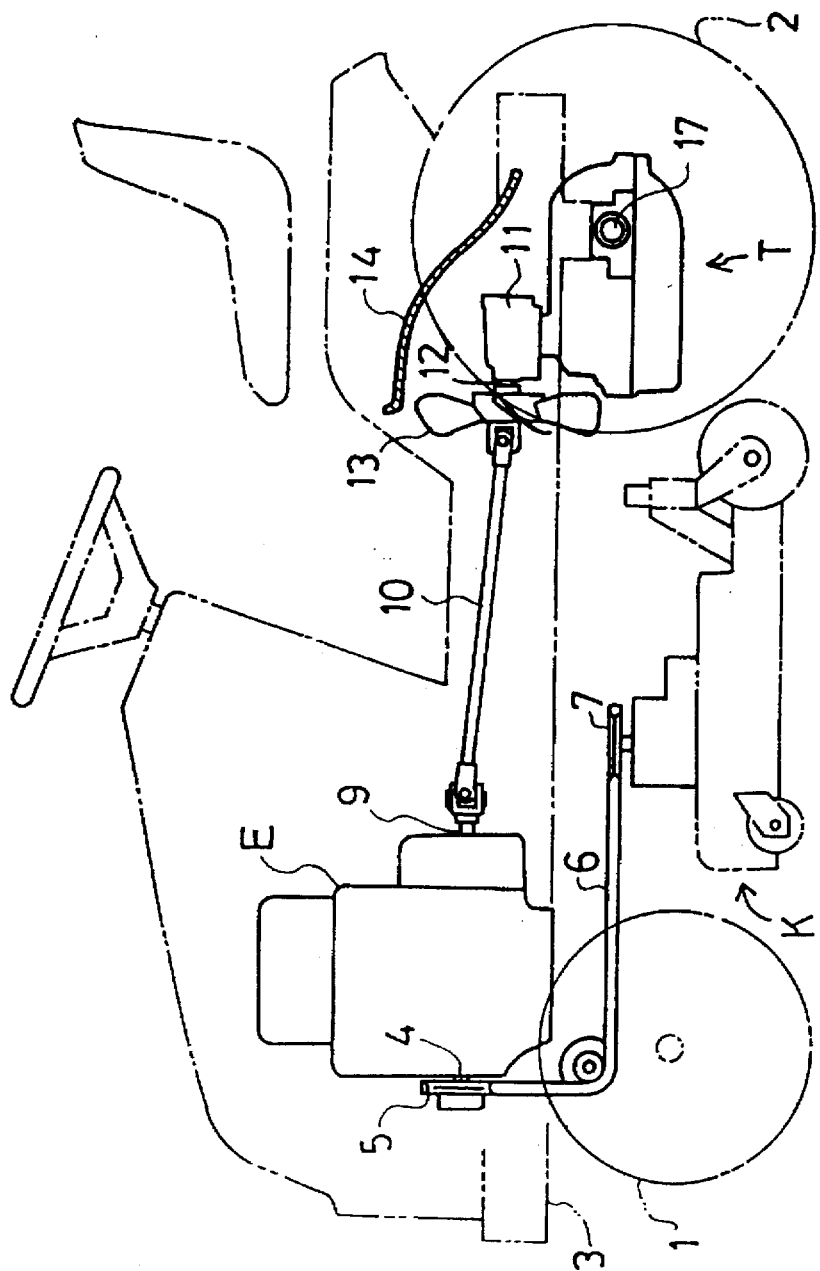
FIG. 1 is a side view of a mower tractor having an axle driving system and a gear box of the present invention.

As shown in FIG. 1, a gear box 11 of the present invention is loaded on an axle driving system T. Gear box 11 and axle driving apparatus T are usable with a working vehicle having an engine E of the type having a crank shaft and of the type that outputs power horizontally. Engine E is mounted on a front upper portion of a body frame 3 from which front wheels 1 and rear wheels 2 are suspended. A mower K is disposed between front wheels 1 and rear wheels 2. Engine E has a crank shaft extending horizontally inside the engine housing and output shafts 4 and 9 projecting forwardly and rearwardly from the housing, respectively. Front output shaft 4 fixedly supports a pulley 5. A belt 6 is wound between an input pulley 7 provided at an upper portion of mower K and pulley 5 on output shaft 4. Power is transmitted perpendicularly to drive mower K.

Rear output shaft 9 projects rearwardly horizontally from engine E. Rear output shaft 9 is connected through a universal joint and a transmission shaft 10 with an input shaft 12 projecting from gear box 11 to transmit power from engine E to axle driving system T for driving a pair of axles 17. A cooling fan 13 is fixed on input shaft 12. When power is transmitted to axle driving system T, cooling fan 13 rotates to cool axle driving system T. Wind from cooling fan 13 blows in a rearward direction relative to the working vehicle. A wind guide plate 14 is provided above axle driving system T so that the cooling wind blows against substantially the entire axle driving system T. Also, equipment, such as frame 3 or a cover, may be formed similar to wind guide plate 14 so as to serve the same purpose.

Next, axle driving system T will be explained in accordance with FIGS. 2, 3 and 4. A housing of axle driving system T is divided into an upper half housing 21 and a lower half housing 22. Both halves 21 and 22 are joined at a horizontal joint surface substantially at a vertical center or middle of the housing, which enables oil to be stored in the housing. A pair of axles 17 perforate upper half housing 21 above the joint surface. Axles 17 are journalled by bearings 21a and project out the sides of the housing of axle driving system T. On bearings 21a are bosses 21b for mounting the housing on body frame 3. Axles 17 are connected by differential gears contained in the housing.

A transmission, differential gears and a power transmission mechanism, which is disposed between a speed change input shaft 23 and the differential gears, are contained in the housing. The transmission, which uses a hydraulic stepless transmission in this embodiment, can use a stepwise slide gear type transmission. The hydraulic transmission comprises a variable displacement hydraulic pump P and a fixed displacement motor M which are mounted on a center section 25. Center section 25 has a substantially L-shaped cross-section when viewed from the front of the vehicle. Center section 25 is mounted on upper half housing 21 by bolts. A pump attaching surface is formed on an upper horizontal surface of center section 25. A cylinder block 26 of hydraulic pump P is rotatably slidably mounted on the pump attaching surface.

A plurality of pistons 27 reciprocate through a biasing spring in cylinder block 26. The head of each piston 27 abuts against a thrust bearing provided at the lower surface of a variable swash plate 28. Speed change input shaft 23 is insertable into and engages with cylinder block 26 along a rotary axis of cylinder block 26 to constitute hydraulic pump P. A distal end of an arm 38 (FIG. 3) is fitted into a recess formed at one side of movable swash plate 28 and is fixed to a speed change shaft 29 vertically insertably supported in upper half housing 21. By rotating speed change shaft 29, which in turn controls arm 38, movable swash plate 28 is slantingly moved with respect to the rotary axis of cylinder block 26, thereby changing a discharge amount and direction of oil discharged from hydraulic pump P.

A speed change arm 50 (FIG. 2) is fixed to speed change shaft 29 that is disposed outside the housing. A rod 51 of a speed change pedal is connected to one end of speed change arm 50. A telescopic portion of a shock absorber 52 is connected to another end of speed change arm 50 to absorb the shock caused when a force is applied to the speed change pedal. A neutral position adjusting screw 49 can also be provided.

A motor attaching surface is formed at a vertical side surface of center section 25. A cylinder block 31 is rotatably slidably mounted on the motor attaching surface. A plurality of reciprocating pistons 32 are movably fitted into cylinder block 31. The heads of pistons 32 abut against a thrust bearing provided at a lower surface of a fixed swash plate :33. A speed change output shaft 24 is insertable into and engages with cylinder block 31 and extends laterally horizontally along a rotary axis of cylinder block 31 so as to constitute hydraulic motor M.

Within center section 25 is a closed fluid circuit which connects intake ports and discharge ports of hydraulic pump P and hydraulic motor M, respectively, so as to circulate an operating oil. A pair of push rods 34' (FIG. 4) outwardly project from center section 25. Push rods 34' are used to forcibly by-pass a high pressure oil passage and a low pressure oil passage in center section 25. Rotation of a by-pass arm 34 at the end of a shaft upwardly projecting from upper half housing 21 simultaneously pushes the pair of push rods 34' so that the closed circuit is open to an oil sump in the housing below center section 25 to allow hydraulic motor M to rotate freely.

A pump casing 35 is attached to a lower surface of center section 25. A charge pump 36 of a trochoid type is disposed in pump casing 35. Charge pump 36 is driven by a lower end of speed change input shaft 23 projecting from the lower surface of center section 25. An intake port is open at a lower surface of pump casing 35. A spring 37 is interposed between pump casing 35 and lower half housing 22 so as to bias pump casing 35 toward center section 25. As a result, pressurized oil having a pressure exceeding the biasing force will be able to leak from between charge pump casing 35 and center section 25 to be stored in an oil sump in the housing. An annular oil filter 39 is disposed between center section 25 and lower housing 22 to surround pump casing 35, so that the oil in the housing sump is filtered before it is taken-in by charge pump 36 through an intake port in pump casing 35.

A speed change output shaft 24 (FIG. 4) has a gear 40 disposed thereon, which transmits power to differential gears associated with axles 17 by way of a power transmission mechanism not shown. The power transmission mechanism is contained in the housing of axle driving system T and comprises a plurality of gears and shafts. As a result, left and right axles 17 are driven. Speed change output shaft 24 is disposed in the housing such that an axis of rotation of speed change output shaft 24 intersects an axis of rotation of speed change input shaft 23. Axles 17 are parallel to speed change output shaft 24 in the housing. Speed change output shaft 24 has an end that projects from the housing and has a brake drum 41 fixedly supported thereon. Brake drum 41 is braked by a brake band (not shown).

Figure 2:
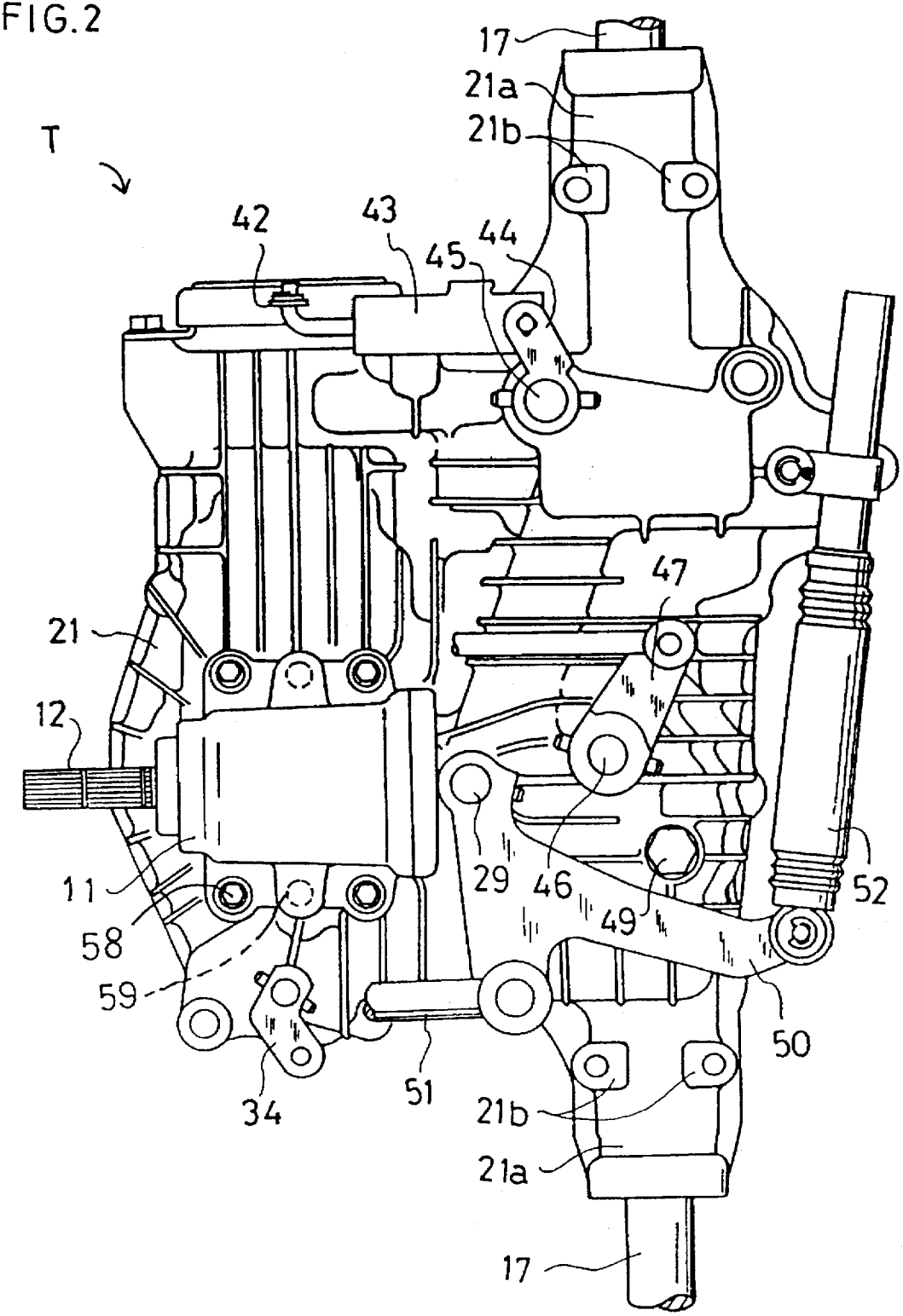
FIG. 2 is a plan view of the axle driving system of the present invention.

A movable portion of the brake band connects with a brake lever 42 shown in FIG. 2. Brake lever 42 is connected to a brake operating lever 44 through a torque spring 43. Brake operating lever 44 is fixed to a brake operating shaft 45 projecting upwardly from upper half housing 21. Brake operating shaft 45 is connected with a brake shaft 46 through a link within the housing and with a brake pedal at a driver's seat through a brake arm 47 fixed on brake shaft 46.

Inside the housing brake shaft 46 interlocks with arm 38 of speed change shaft 29 so that when a force is applied to the brake pedal, the brake band is tightened to subject speed change output shaft 24 to a braking action; and at the same time, speed change shaft 29 in the speed change position is rotated to automatically return movable swash plate 28 to a neutral position.

Next, explanation will be given on a principal portion of the invention. Specifically, the transmission of power from engine E to speed change input shaft 23 through gear box 11 will be discussed. Gear box 11, as shown in FIGS. 3 and 4, has upper, lower, from and rear walls. The lower, from and rear walls each have an opening. Input shaft 12 is longitudinally inserted into gear box 11 through the opening provided in the from wall. The opening in the rear wall of gear box 11 is covered by a lid 19. Input shaft 12 is rotatably supported by beatings 53 and 54 fitted into shaft bores formed in lid 19 and the front wall respectively.

Figure 5:
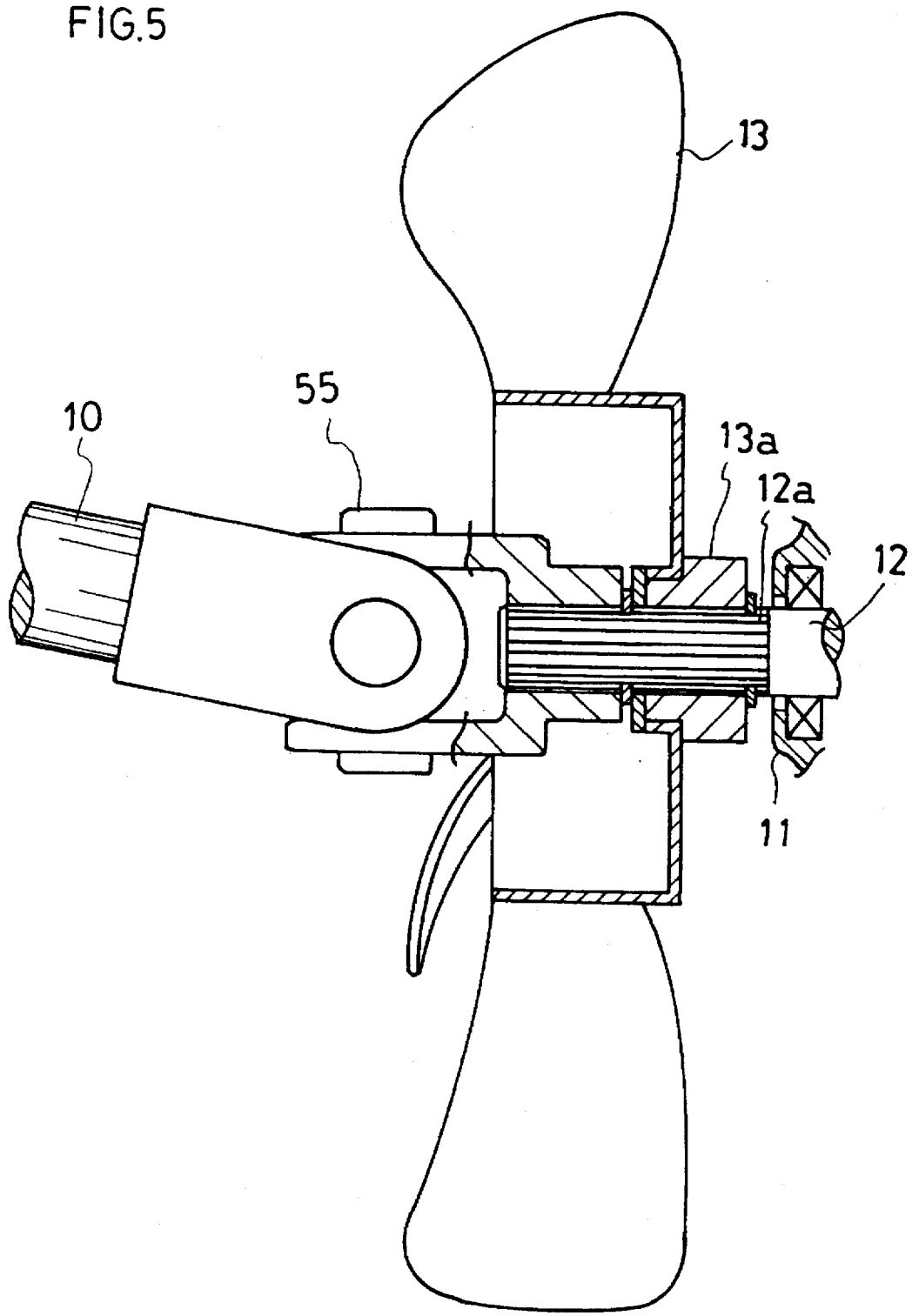
FIG. 5 is a partial sectional side view of an input shaft where a cooling fan is mounted thereon.

At a from end of input shaft 12 outside gear box 11 is a spline 12a as shown in FIG. 5. A boss 13a of cooling fan 13 and a universal joint 55 are longitudinally juxtaposed and engage with each other on spline 12a. A bevel gear 15, as shown in FIG. 3, is fixed onto input shaft 12 in gear box 11 and engages with a bevel gear 16 that is spline-engageable with the upper end of speed change input shaft 23.

Figure 3:
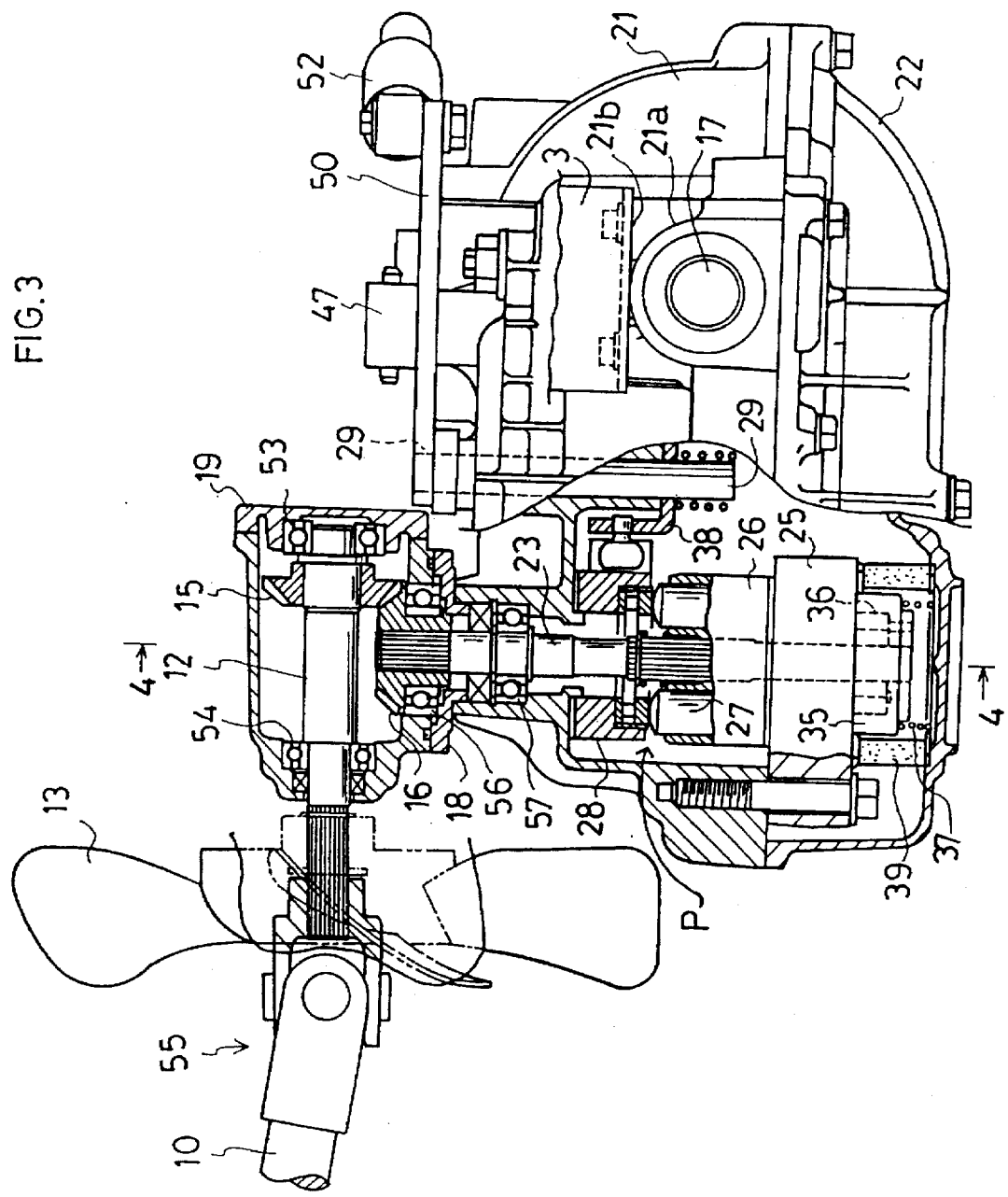
FIG. 3 is a partial sectional side view of the axle driving system and the gear box of the present invention.

As shown in FIG. 3, a bearing 56 is interposed between an outer periphery of a boss of bevel gear 16 and the lower wall of gear box 11. A bearing 57 is interposed between an intermediate portion of speed change input shaft 23 and upper half housing 21, so that the upper portion of speed change input shaft 23 is double-supported by bearings 56 and 57. The lower portion of speed change input shaft 23 is supported by center section 25. Accordingly, the upper portion of speed change input shaft 23, at gear box 11, only needs to be supported by one bearing 56.

Figure 4:
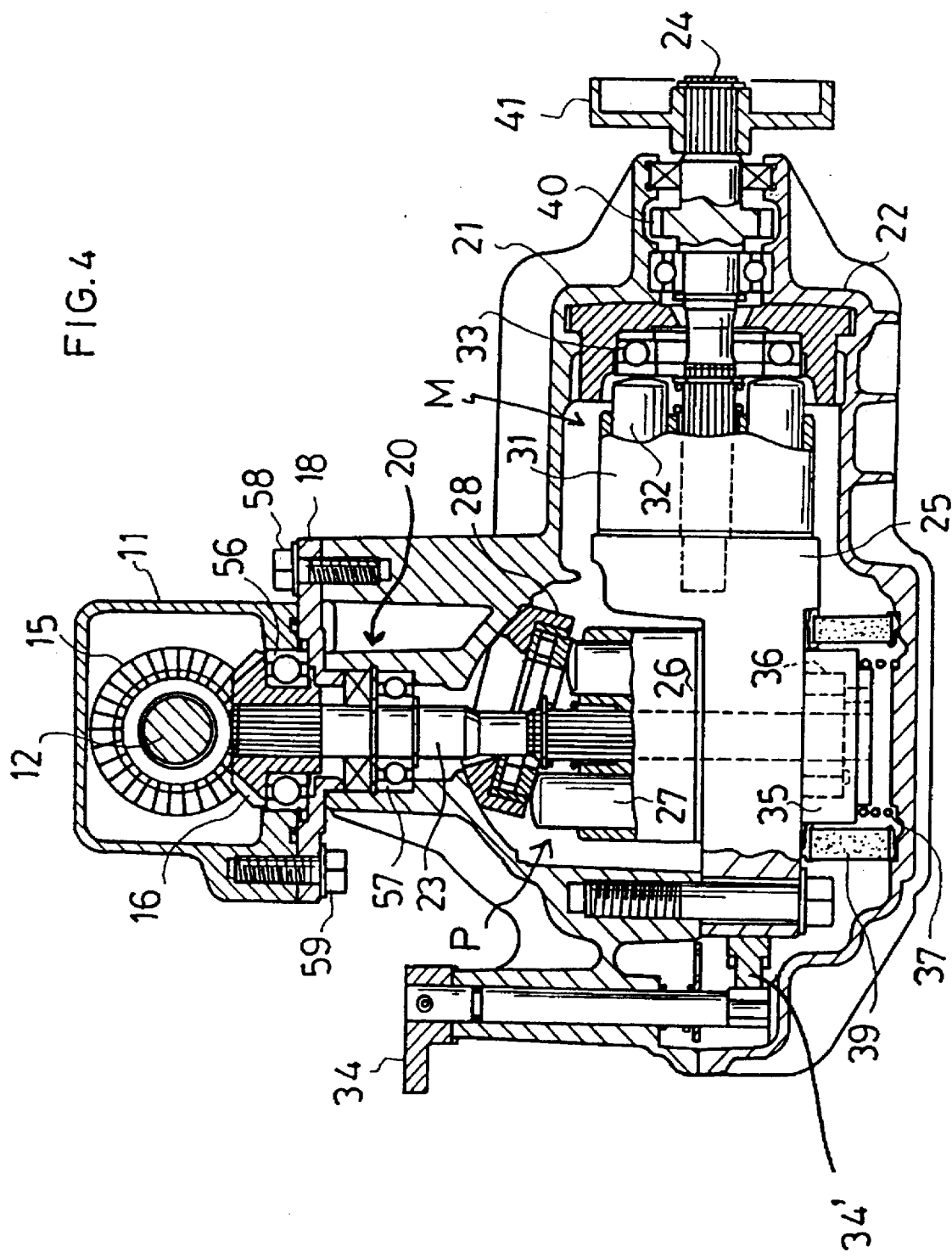
FIG. 4 is a cross-sectional view taken along line 4—4 in FIG. 3.

As shown in FIG. 4, a mounting plate 18 is attached to a lower surface of the lower wall of gear box 11 by bolts 59. Mounting plate 18 is fixed to the upper surface of upper half housing 21 through bolts 58, thereby mounting gear box 11 onto the upper surface of the housing.

Figure 6:
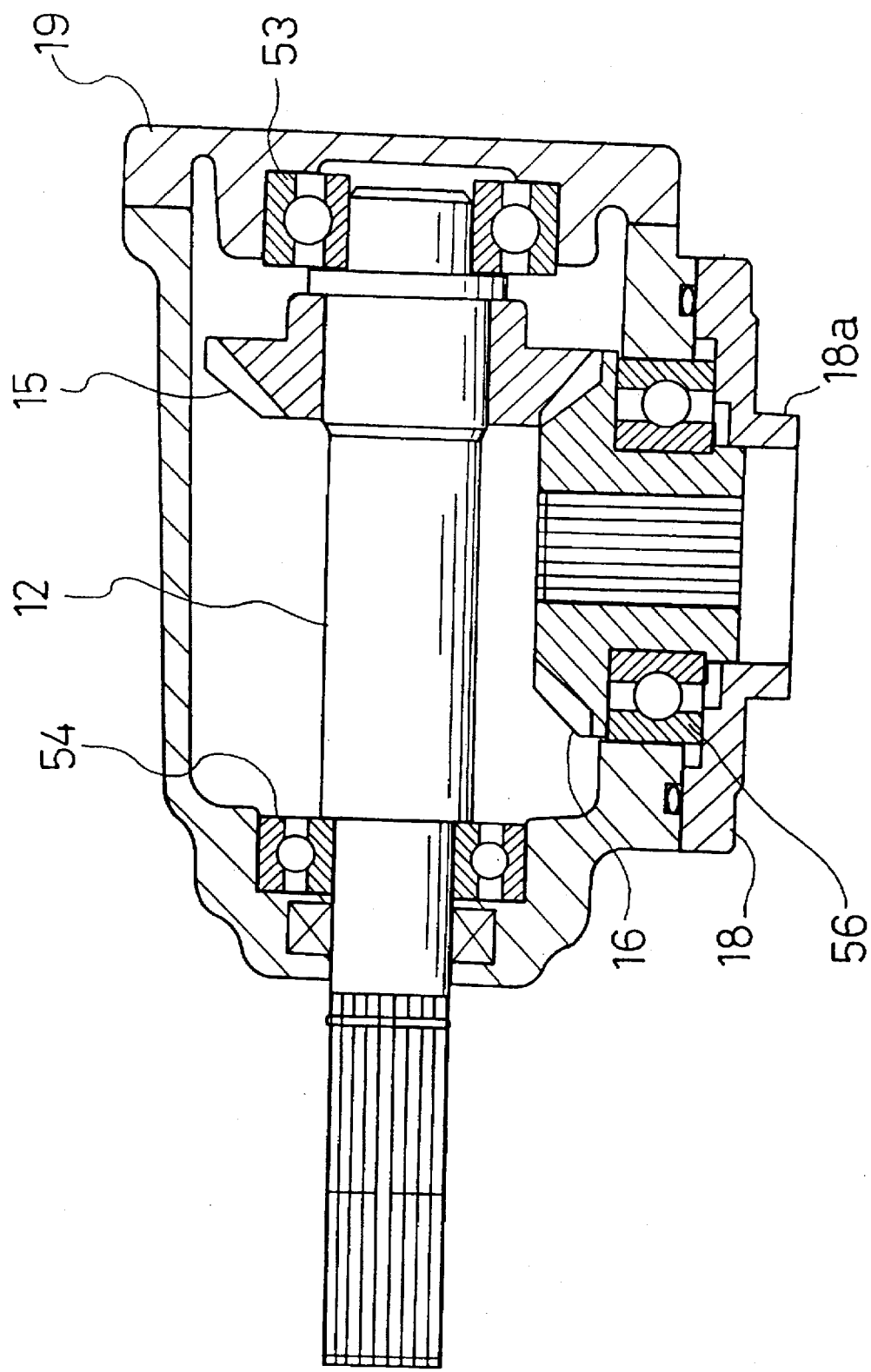
FIG. 6 is a sectional side view of the gear box of the present invention.

As shown in FIGS. 4 and 6, mounting plate 18 has a circular convex portion 18a, which has a center that is along a rotary axis of bevel gear 16. At the upper surface of upper half housing 21 where speed change input shaft 23 is located, upper half housing 21 is formed with a hollow cylindrical portion 20. Hollow cylindrical portion 20 has a distal end and an inner surface. An axis of rotation of speed change input shaft 23 is aligned with the rotary axis of bevel gear 16 by inserting circular convex portion 18a of mounting plate 18 into the distal end of hollow cylindrical portion 20. With this arrangement, the accuracy of bevel gear 15 meshing with bevel gear 16 is optimized.

Bolts 58 are removable so that gear box 11 can be removed from the housing. At the same time, bevel gear 16 can be removed from speed change input shaft 23. In this modified embodiment of the invention, in order to make gear box 11 compact, bearing 56 adjacent to gear box 11 and bearing 57 adjacent to upper half housing 21 stably support speed change input shaft 23.

When gear box 11 is removed from the housing, an input pulley can be fixedly fined onto the spline on speed change input shaft 23. This enables axle driving system T without gear box 11 to be adaptable to an engine having an output shaft that extends vertically. In the alternative, gear box 11 can be removed from the housing so that a modified embodiment of the gear box, as will be discussed below, can be interchangeably mounted onto the housing.

As discussed above, gear box 11 is fixed onto the housing so that power can be transmitted from engine E, having a horizontal output shaft 9, through a transmission shaft 10, or the like, to input shaft 12 of gear box 11. In comparison, where the power is transmitted from engine E by a belt, as with the present invention, the durability is improved and slipping is eliminated. As a result, the power transmission efficiency is improved and a larger driving force can be transmitted.

Figure 7:
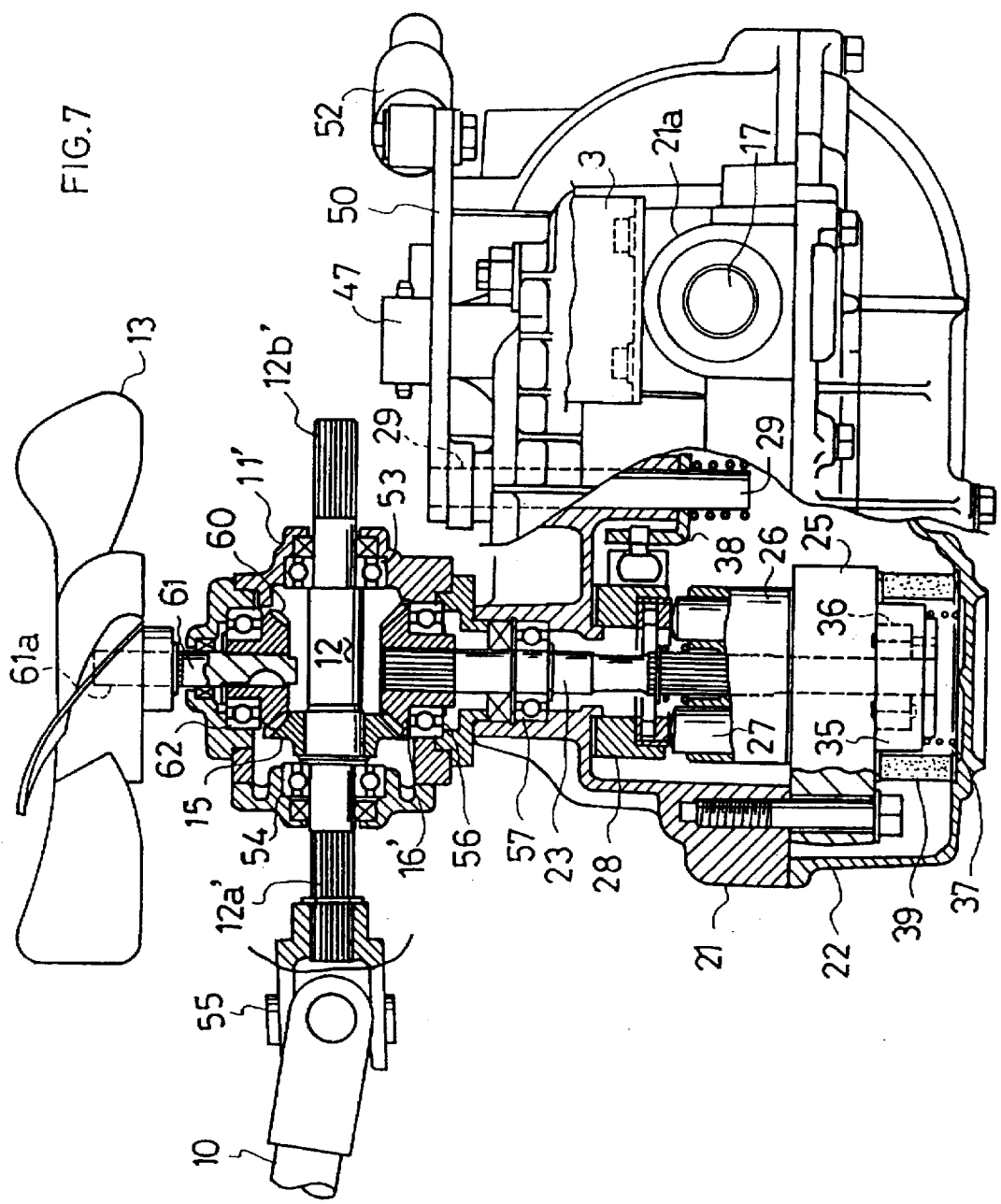
FIG. 7 is a partial sectional side view of the axle driving system including a second embodiment of the gear box of the present invention.

A second embodiment of a gear box can be constructed as shown in FIG. 7 at 11'. In this embodiment, input shaft 12' longitudinally perforates gear box 11'. A universal joint 55 is fixedly fitted onto a spline 12a' at the front end of input shaft 12'. A spline 12b' is formed at the rear end of input shaft 12' to serve as an external power take-off (PTO) shaft, thereby enabling power to be transmitted in a simple manner to the exterior of the transmission.

Bevel gear 15 is fixed on input shaft 12' in gear box 11' and engages with bevel gear 16, as discussed above in the first embodiment. Bevel gear 15 also engages with bevel gear 60 in gear box 11'. Bevel gear 60 is fixedly fitted onto a vertical shaft 61. Vertical shaft 61 is rotatably pivotally supported by a bearing 62 to a cover mounted to the upper wall of gear box 11' and is disposed coaxially with speed change input shaft 23. The upper end of vertical shaft 61 projects upwardly from gear box 11' and has a spline 61a with a cooling fan 13 fixedly fitted thereon.

The PTO shaft at the rear end of input shaft 12' is used to drive other working machines without having to provide a new gear box for the PTO shaft. Vertical shaft 61 is positioned to provide cooling fan 13 above the housing. As a result, a larger diameter fan can be mounted and the cooling wind from fan 13 can be directed by wind guide plate 14 (FIG. 1) to blow downwardly against the housing thereby improving the cooling efficiency.

Figure 8:
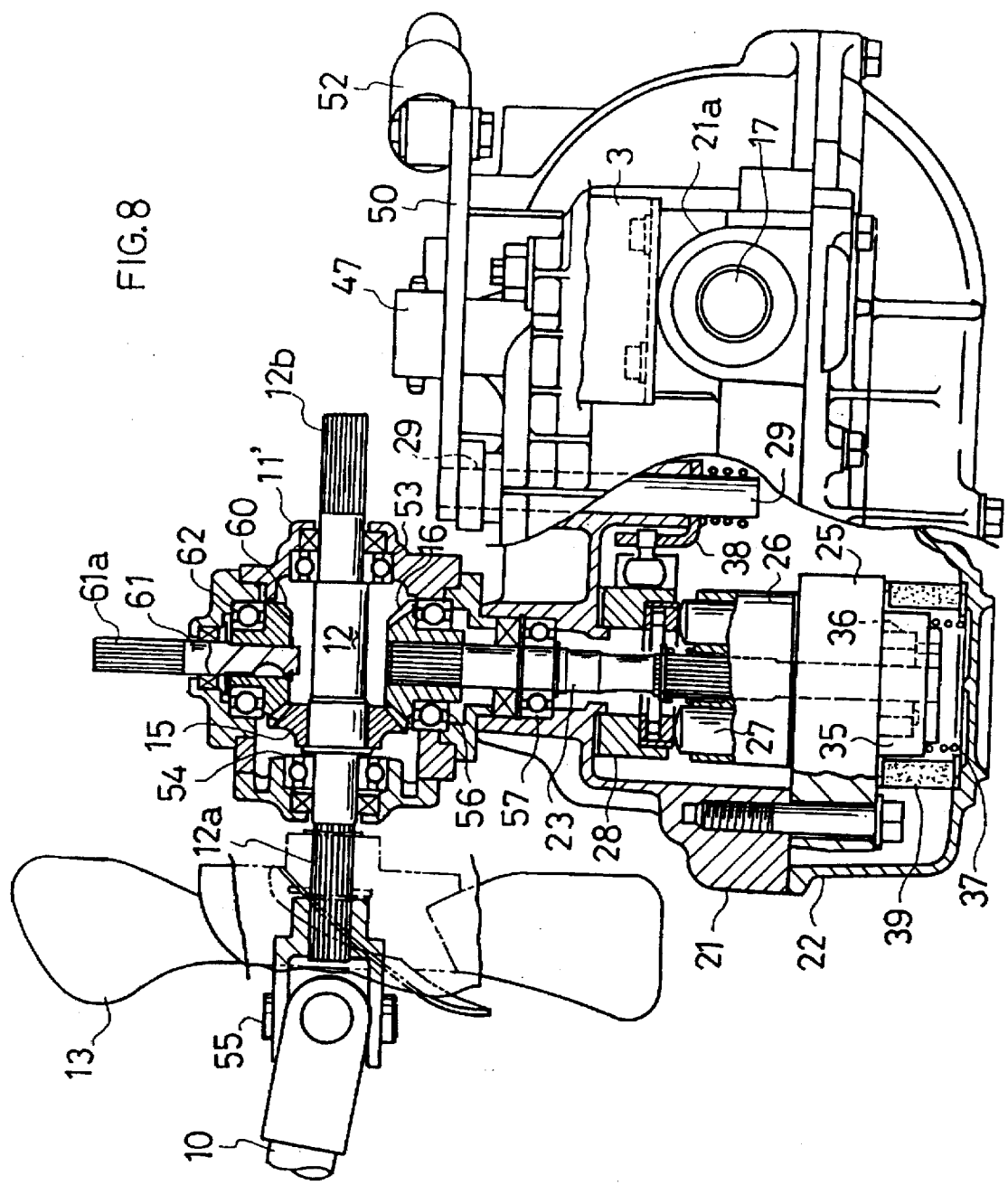
FIG. 8 is a partial sectional side view of the axle driving system including a third embodiment of the gear box of the present invention.

The third embodiment of the invention, as shown in FIG. 8, is constructed so that a cooling fan 13 is fitted onto input shaft 12 in the same manner as in the first embodiment. However, in this embodiment, vertical shaft 61 projects upwardly from gear box 11' to be driven by a bevel gear 60 in the same manner as in the second embodiment. This construction makes it possible to fill the housing of the axle driving system with operating oil before shipment. This construction also makes it possible to connect vertical shaft 61 with a drive source, such as a motor, so that the system can be driven in shipment for purposes of being inspected or adjusted by the same type of operation system that is used to drive a type of axle driving system without a gear box.

Figure 9:
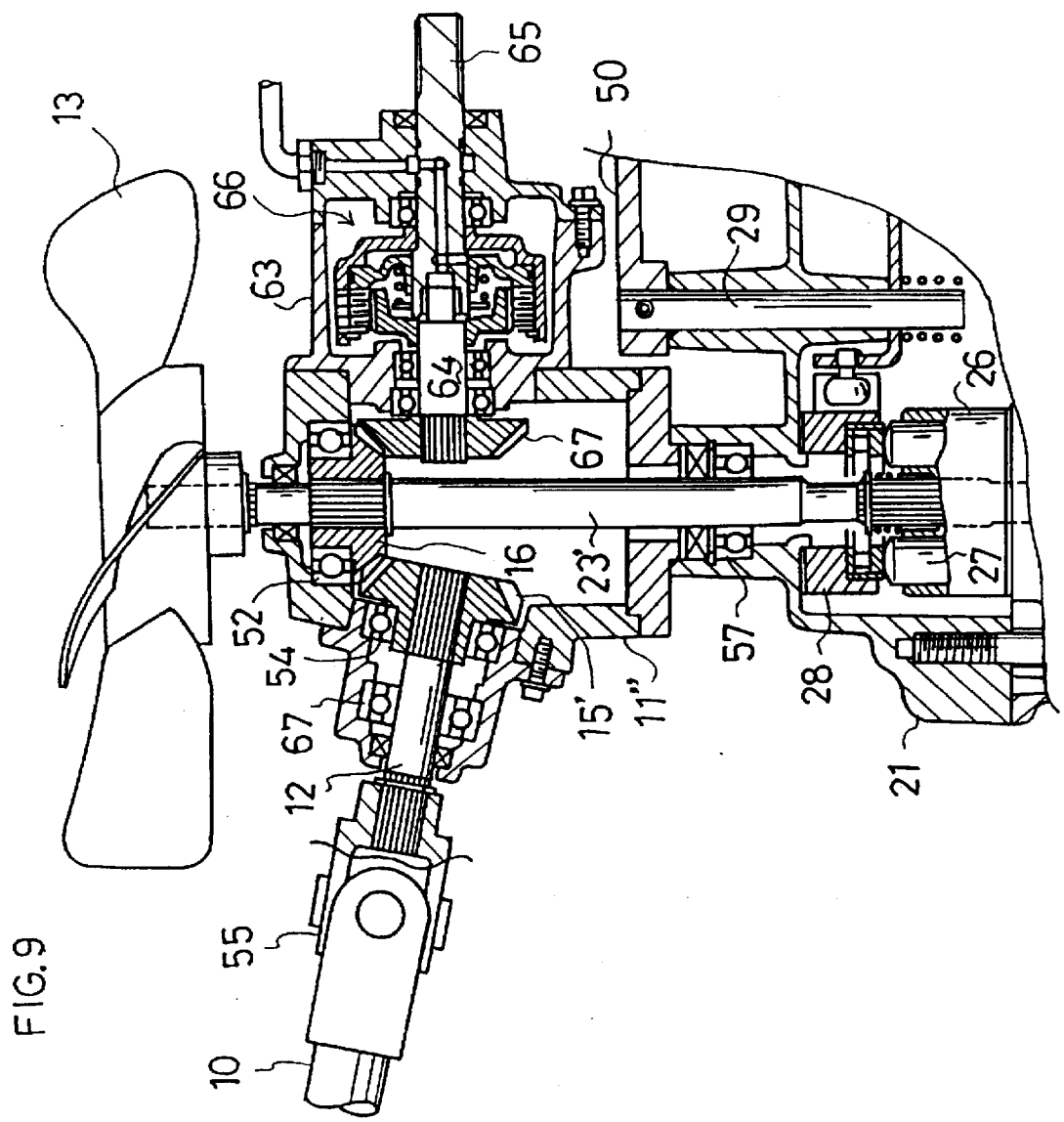
FIG. 9 is a sectional side view of a fourth embodiment of the gear box of the present invention.

In the fourth embodiment of the invention, as shown in FIG. 9, the front portion of input shaft 12 is slanted axially upwardly relative to the horizontal and toward output shaft 9 of engine E. Bearings 54 and 67 in a cover mounted on a front wall of gear box 11" support input shaft 12 in this slanted manner. Thus, input shaft 12 and transmission shaft 10 are linearly disposed. A conventional universal joint has a different angle in the transmission direction. Therefore, to change the angular speed in the transmission direction, an expensive joint, such as a constant velocity joint, must be used. With the housing of gear box 11" of this fourth embodiment of the present invention, power is transmitted linearly thereby enabling an inexpensive joint to be used. This fourth embodiment also increases the amount of available space above the mower.

Also in this fourth embodiment, a bevel gear 15' is fixed onto input shaft 12 in gear box 11". A speed change input shaft 23' extends upwardly to project externally upwardly from gear box 11". Bevel gear 16 is fixed onto the upper portion of speed change input shaft 23' in gear box 11" through a bearing 52 so as to engage with bevel gear 15'. A cooling fan 13 is fixed onto the upper end of speed change input shaft 23' outside gear box 11".

A clutch casing 63 also is fixed to a rear surface of gear box 11". A transmission shaft 64 and a PTO shaft 65 are supported coaxially with each other in clutch casing 63. A bevel gear 67 is fixed to the front end of transmission shaft 64 and engages with bevel gear 16. A hydraulic clutch means 66 is interposed between transmission shaft 64 and PTO shaft 65 for selectively engaging transmission shaft 64 and PTO shaft 65 so that pressurized oil is selectively fed from a hydraulic control valve (not shown) to clutch means 66. When clutch means 66 is engaged, power is transmitted to PTO shaft 65. When clutch means 66 is disengaged, power is not transmitted to PTO shaft 65. Clutch means 66 may comprise a mechanical clutch, an electromagnetic clutch, or the equivalent.

Figure 10:
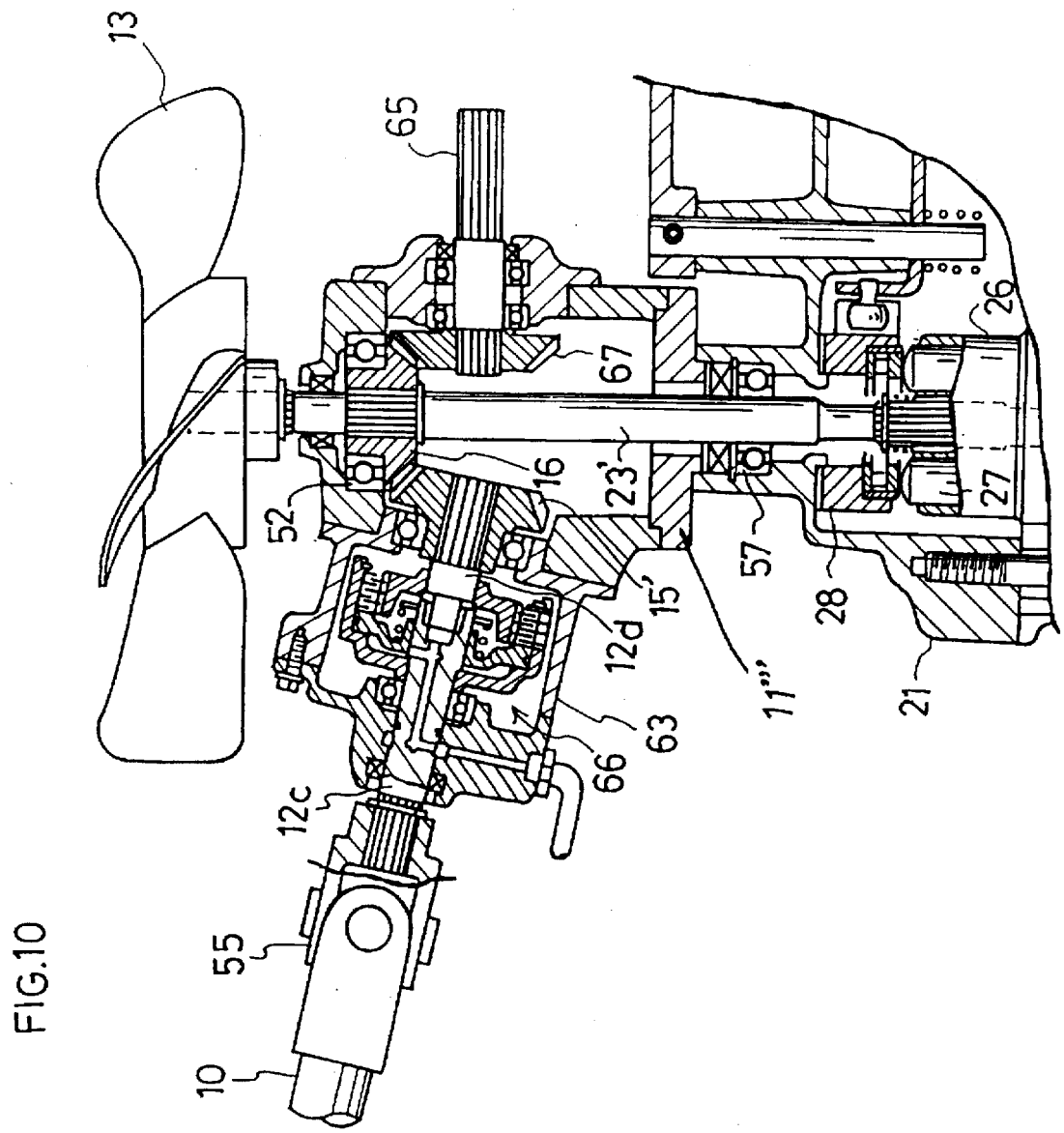
FIG. 10 is a sectional side view showing a fifth embodiment of the gear box of the present invention.
Figure 11:
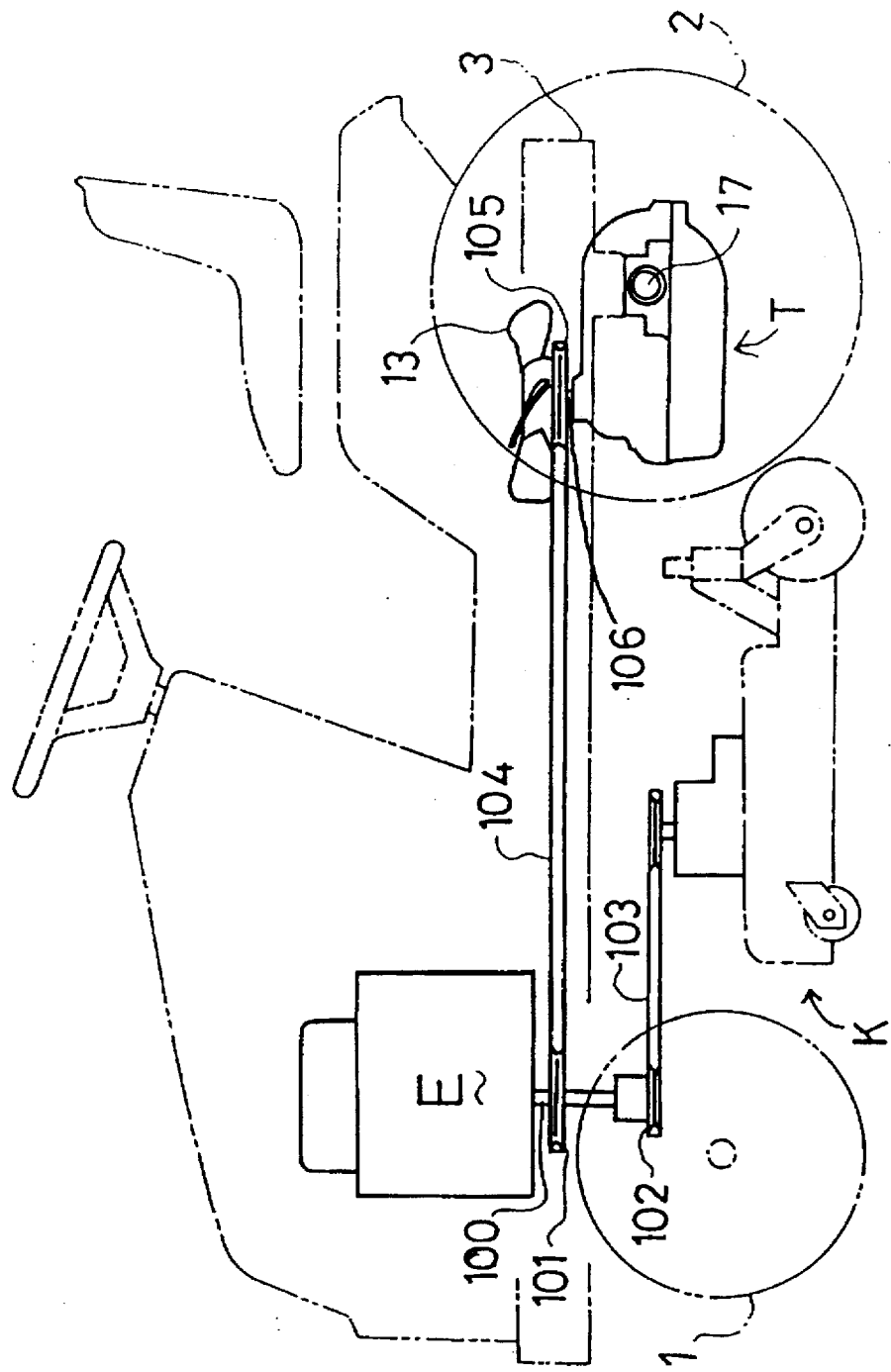
FIG. 11 is a side view of a mower tractor with a conventional axle driving system.

Similarly, as shown in FIG. 10, a gear box 11''' can be constructed so that hydraulic clutch means 66 is disposed at the power receiving side of input shaft 12. Clutch means 66 is interposed between a front input shaft 12c and a rear input shaft 12d for connecting or disconnecting power transmission from engine E to axle driving system T or to PTO shaft 65.

In this embodiment, the speed change means uses the hydraulic stepless speed change unit. However, a stepwise speed change unit, such as a gear selection system or a hydraulic clutch system, may instead be used. When speed change input shaft 23 is disposed vertically, the speed change means therefor is not limited.

In another embodiment of the invention, a bevel gear box may mounted on an input shaft of a vertical crank shaft type engine so that the speed change input shaft, corresponding to the horizontal input shaft, can transmit power to the axle driving system having a vertical speed change input shaft.

Although the invention has been described with reference to several different embodiments, these embodiments are merely exemplary and not limiting of the invention which is defined by the appended claims.

What is claimed is:

1. An axle driving system for being mounted on a working vehicle of a type having a prime mover with a substantially horizontal power output for driving a wheel of the working vehicle through the axle driving system, the axle driving system comprising:

a housing having an upper surface;

a transmission housed in said housing for driving an axle;

a speed change input shaft drivingly connected with said transmission having a first axis of rotation;

a speed change output shaft drivingly connected with said transmission and having a second axis of rotation, wherein said first axis of rotation intersects said second axis of rotation;

a gear box fixed on said upper surface of said housing; and an input shaft substantially horizontally disposed at least in part in said gear box, wherein said input shaft is drivingly connected to said speed change input shaft.

2. An axle driving system according to claim 1, wherein said gear box is removably fixed to said housing.

3. An axle driving system according to claim 1, further comprising:

a first bevel gear fixed on said input shaft in said gear box;

a second bevel gear rotatably supported in said gear box, wherein said input shaft is disposed substantially perpendicular to said speed change input shaft in said gear box and said first bevel gear engages with said second bevel gear in said gear box and said second bevel gear is fixed on said speed change input shaft, thereby engaging said input shaft and said speed change input shaft; and a bearing disposed in said housing, wherein said bearing supports said speed change input shaft.

4. An axle driving system according to claim 1, wherein said input shaft has a portion that is disposed at an exterior of said gear box, a cooling fan being fixed onto said portion of said input shaft.

5. An axle driving system according to claim 1, wherein said input shaft has a power receiving end for receiving power from the prime mover and a power transmitting end opposite to said power receiving end and said power transmitting end perforates said gear box and comprises a power take-off shaft.

6. An axle driving system according to claim 5, further comprising:

a clutch means for controlling an engagement of said power take-off shaft.

7. An axle driving system according to claim 1, wherein said gear box further comprises:

a first bevel gear fixed on said input shaft in said gear box;

a second bevel gear fixed on said speed change input shaft, and rotatably supported in said gear box, wherein said input shaft is disposed substantially perpendicular to said speed change input shaft in said gear box and said first bevel gear engages with said second bevel gear in said gear box thereby engaging said input shaft and said speed change input shaft;

an upwardly projecting vertical shaft disposed within said gear box;

a third bevel gear disposed on said vertical shaft, wherein said third bevel gear is in engagement with said first bevel gear; and a cooling fan disposed on said vertical shaft.

8. An axle driving system according to claim 1, wherein said input shaft is disposed at a slant relative to a horizontal.

9. An axle driving system according to claim 1, further comprising:

a clutch means for controlling a transmission of power into said axle driving apparatus, wherein said clutch means is disposed on a portion of said input shaft.

10. An axle driving system according to claim 1, wherein said transmission comprises a hydraulic stepless transmission.

11. An axle driving system according to claim 1, further comprising:

a mounting plate for fixing said gear box to said upper surface of said housing, wherein said mounting plate is fixed on said upper surface of said housing.

12. An axle driving system according to claim 11, further comprising:

a mounting plate attached on a lower surface of said gear box when said gear box is fixed on said upper surface of the housing.

13. An axle driving system according to claim 12, further comprising:

a bevel gear disposed in said gear box, said bevel gear having a rotary axis; and an alignment means for aligning said rotational axis of said speed change input shaft and said rotary axis of said bevel gear.

* * * * *